US011104577B2

(12) United States Patent
Savsunenko et al.

(10) Patent No.: US 11,104,577 B2
(45) Date of Patent: Aug. 31, 2021

(54) METHOD FOR PREPARATION AND SEPARATION OF ATOMIC LAYER THICKNESS PLATELETS FROM GRAPHITE OR OTHER LAYERED MATERIALS

(71) Applicant: Graphene Laboratories Inc., Calverton, NY (US)

(72) Inventors: Oleksandr Savsunenko, Kiev (UA); Elena Polyakova, Baiting Hollow, NY (US); Daniel Stolyarov, Baiting Hollow, NY (US)

(73) Assignee: G6 MATERIALS CORP., Ronkonkoma, NY (US)

(*) Notice: Subject to any disclaimer, the term of this patent is extended or adjusted under 35 U.S.C. 154(b) by 1722 days.

(21) Appl. No.: 14/867,751

(22) Filed: Sep. 28, 2015

(65) Prior Publication Data

US 2016/0096735 A1    Apr. 7, 2016

Related U.S. Application Data

(60) Provisional application No. 62/058,313, filed on Oct. 1, 2014.

(51) Int. Cl.
*C01B 32/19* (2017.01)
*B07B 7/00* (2006.01)
(Continued)

(52) U.S. Cl.
CPC ............... *C01B 32/19* (2017.08); *B07B 7/00* (2013.01); *C01B 32/192* (2017.08); *C01B 32/194* (2017.08); *C01B 32/196* (2017.08)

(58) Field of Classification Search
CPC ....... C01B 32/19; C01B 32/192; C01B 32/194; C01B 32/196; B07B 7/00
(Continued)

(56) References Cited

U.S. PATENT DOCUMENTS 3,537,188 A * 11/1970 Harris ................. B04C 9/00
                                                        34/592
4,253,942 A *  3/1981 Gaumann ............ B03B 5/623
                                                        209/17
(Continued)

FOREIGN PATENT DOCUMENTS

EP          2 738 138 A2    6/2014
WO    WO 2009/089268 A2    7/2009
(Continued)

OTHER PUBLICATIONS

International Search Report, PCTUS2015/052693, dated Feb. 15, 2016 (7 pages).
(Continued)

*Primary Examiner* — Terrell H Matthews
(74) *Attorney, Agent, or Firm* — Mark Malek; Paul Ditmyer; Widerman Malek, PL

(57) ABSTRACT

A method and system of separating graphene nanoplatelets (GNPs) from initial graphite raw material is disclosed. The raw material is exfoliated to create a percentage of separated GNPs in a resulting bulk mixture. Agglomerates between the separated graphene nanoplatelets are broken. The mixture is separated into fractions having nanoparticles of different GNP content and size distribution. Each different range of nanoparticles is separated into GNPs and graphite nanopowder via a medium flow process or via electrostatic separation or both.

10 Claims, 9 Drawing Sheets

(51) Int. Cl.
    *C01B 32/196* (2017.01)
    *C01B 32/192* (2017.01)
    *C01B 32/194* (2017.01)

(58) Field of Classification Search
    USPC ........................................................ 209/12.2
    See application file for complete search history.

(56) References Cited

U.S. PATENT DOCUMENTS

| | | | |
|---|---|---|---|
| 8,703,090 B2* | 4/2014 | Tour ........................ | C01B 32/23 423/447.1 |
| 2016/0089679 A1* | 3/2016 | Prestes ................... | B03D 1/242 209/166 |
| 2016/0096735 A1* | 4/2016 | Savsunenko .......... | C01B 32/194 423/448 |
| 2017/0225149 A1* | 8/2017 | Zhang .................... | B01J 20/286 |

FOREIGN PATENT DOCUMENTS

| | | | | |
|---|---|---|---|---|
| WO | WO-2011154748 A1 | * | 12/2011 | ........... C01B 32/194 |
| WO | WO 2014/097032 A1 | | 6/2014 | |
| WO | WO 2015/032646 A1 | | 3/2015 | |

OTHER PUBLICATIONS

Written Opinion of the International Searching Authority, PCTUS2015/052693, dated Feb. 15, 2016 (11 pages).

\* cited by examiner

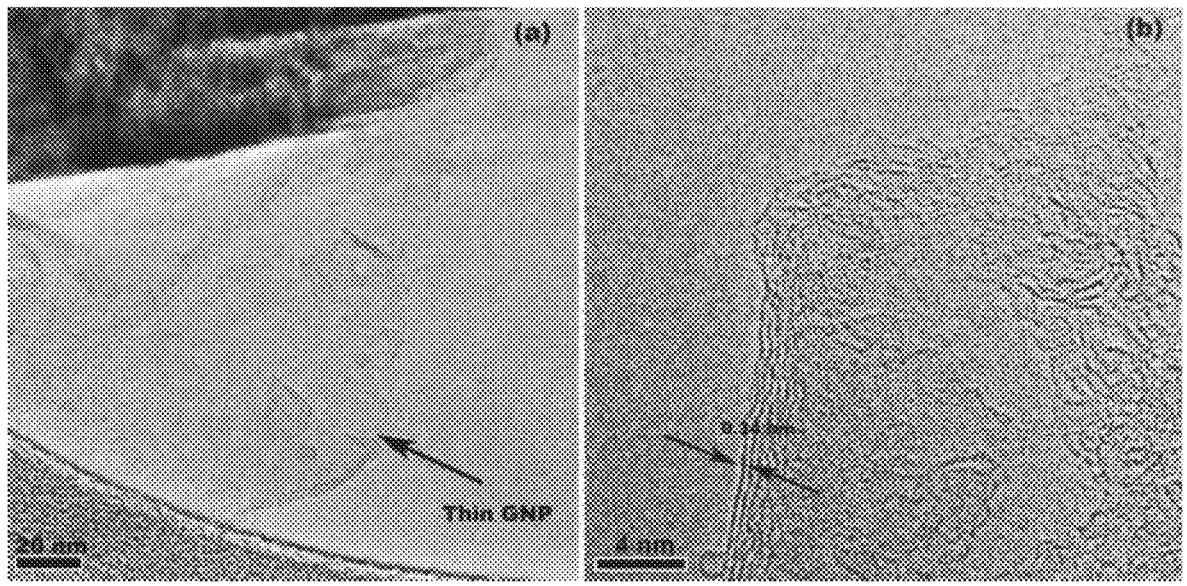
1002
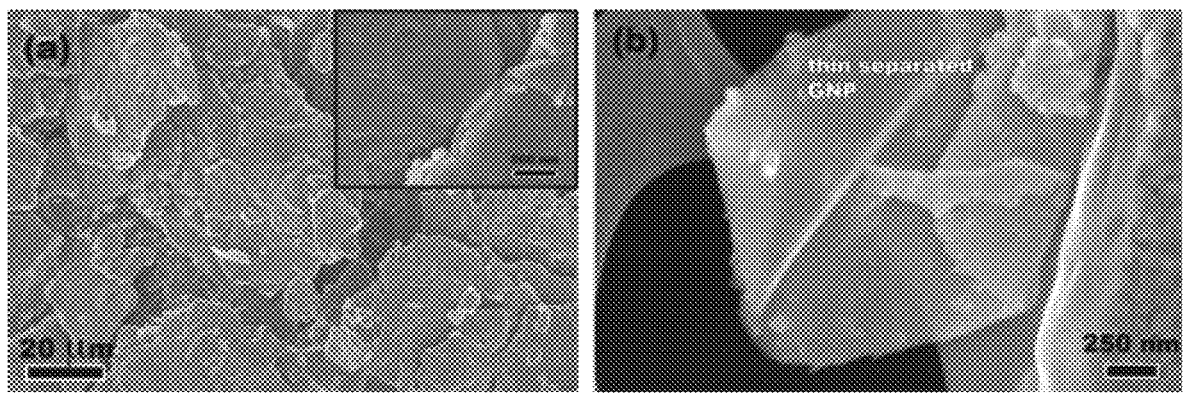
1001
FIG 10

METHOD FOR PREPARATION AND SEPARATION OF ATOMIC LAYER THICKNESS PLATELETS FROM GRAPHITE OR OTHER LAYERED MATERIALS

PRIORITY

The present application claims priority to provisional application No. 62/058,313, filed on Oct. 1, 2014. That application is hereby incorporated by reference in its entirety.

TECHNICAL FIELD

The present invention relates to preparation of graphene nanoplatelets (GNPs). More particularly, the present invention relates to an apparatus and method for preparing and separating a mixture of atomic layer thick graphene nanoplatelets directly from graphite. This invention is also suitable for fabrication of nanoplatelets of any other layered materials, such as $MoS_2$, $WS_2$, BN, etc.

BACKGROUND

Graphene nanoplatelets (GNPs) are a new class of layered nanomaterials, known for their useful properties including high electrical and thermal conductivity, high chemical stability and mechanical stiffness. These nanoplatelets are comprised of one to hundreds of graphene layers, and have a thickness from 0.34 nm up to 100 nm. Their lateral dimensions range from 10 nm up to 100 microns. These platelets can be mixed with a broad range of matrices (epoxies, plastics, cements, rubber, etc.), resulting in composite materials, which can greatly outperform the properties of the host materials alone. For example, GNPs may be combined with thermoplastics to create nano-composite materials for 3-D printing. In recent years, GNPs, as a multifunctional additive, have shown a noticeable progress in fabrication of advanced composite materials, graphene inks, energy storage devise, and more.

Performance as well as retail price of GNPs strongly depends on the thickness of the nanoplatelets (the number of atomic layers). Based on the data available in 2015, the price of thick (50 nm and thicker) GNPs varies from $10 to $100 per kg; however, thick GNPs provide little advantage over other inexpensive carbon-based fillers, such as extended graphite. On the other hand, the most attractive high-quality few atomic layer GNPs may cost up to $10,000 per kg. In many cases, during nanoplatelets fabrication a mixture of GNPs with varying thicknesses is produced, in which the fraction of thin graphene nanoplatelets (less than 10 nm) is no more than a few percent of the overall composition. Considering the difference in pricing, technology allowing an efficient recovery of the valuable few atomic layer fraction of GNP is much needed development and is well justified.

For the last several decades, a number of methods have been developed for production and separation of thin nanoplatelets of layered materials. In the case of GNPs, most techniques include intercalation of graphite following by the intercalant expansion and subsequent flake exfoliation by means of chemical reaction and/or decomposition or electrostatic repulsion. Predominantly, the final product is the mixture of graphene flakes of different thickness and lateral size. Furthermore, most GNP production often triggers the formation of surface defects that results in degradation of desired GNP physical properties.

A single layer graphene oxide (GO) can be produced by Hummer's method or its modern variation. In this process, the oxidation functional groups are introduced into the graphite inter layer space and GO flakes is subsequently exfoliated. Even though GO can be reduced back to form conductive reduced graphene oxide (rGO), the method introduces electronic and extended defects and, thus, the pristine graphene is never recovered. Overall, GO and rGO institute a separate class of materials and their physical and chemical properties drastically differ from those of GNPs.

Preferably, a successful method for GNP production should avoid the oxidizing stage and manufacture GNPs directly from non-oxidized graphite in order to obtain a pristine graphene product. This is accomplished by delivering enough energy to peel off graphene sheets from a solid graphite crystal, achievable through micromechanical exfoliations by means of applying shear stress in: air, water, organic solvents, water with solvents, etc. One of the methods allowing fabrication of a high quality conductive GNPs utilizes liquid phase ultrasonic exfoliation process. However, the process is labor intensive, employs harsh chemicals, and requires post processing drying that increase in final GNP price. GNPs of a good crystallinity and quality can be manufactures using a HDPlas process where functionalization and exfoliation achieved via high-energy plasma. This process does not require chemicals or post drying; however, it is expensive and produces GNP with wide thickness distribution. Finally, microwave irradiation can be also used to supply the required energy to graphite to make it sequentially oxidized, exfoliated, and reduced back to graphene in very short time periods. Yet, the oxidation stage introduces structural defects limiting usability of such GNPs.

All of the methods described above rely on homogeneous treatment of the initial feedstock. The final separation of GNPs based on the flake thickness can be achieved via centrifugation. However, this method works well in a laboratory environment, but not suitable for industrial scale production. Thus, there is a need for an industrially scalable separation technique that is capable of efficient extraction of few-layer-thick GNPs even if the content of such GNPs in the mixture is relatively low.

SUMMARY

One disclosed example is a method for increasing the content of the GNP with lower thickness of the platelets (enrichment) by passing the mixture through the drift column via media flow process. The media could be either liquid or gas. In the latter case, the process can be done at atmospheric pressure or at the pressure that substantially lower than atmospheric Another disclosed example is the method for increasing the content of the GNP with lower thickness of the platelets (enrichment) where GNP are supplied with an electric charge and then passed through an electrostatic field.

Another embodiment of the invention disclosed herein is a method of separating GNPs directly from initial graphite raw material. The raw material is exfoliated to create a percentage of separated GNPs in a resulting bulk mixture. Intermediate agglomerates are further broken. The mixture is separated into fractions having a different GNP content and size distributions. Finally, GNPs are fully separated from mixture via a medium flow process or electrostatic separation or a combination of the two.

Another example is a system for separating GNPs directly from initial graphite raw material. The system includes an exfoliation module for exfoliating the raw material to create a percentage of separated GNPs in a resulting bulk mixture. An agglomerate-breaking module is coupled to the exfoliation module and breaks up agglomerates in the bulk mixture. A separation module is coupled to the agglomerate-breaking module and separates the mixture into particles having different fractions of GNPs of different size distribution. A graphene separation module separates GNP from each different range of nanoparticles via a medium flow process in a drift column or electrostatic separation or a combination of the two.

These and other advantages, aspects, and features of the present invention will become more apparent from the following detailed description of embodiments and implementations of the present invention when viewed in conjunction with the accompanying drawings. The present invention is also capable of other embodiments and different embodiments, and details can be modified in various respects without departing from the spirit and scope of the present invention. Accordingly, the drawings and descriptions below are to be regarded as illustrative in nature, and not as restrictive.

BRIEF DESCRIPTION OF THE DRAWINGS

The accompanying drawings illustrate an embodiment of the invention and depict the above-mentioned and other features of this invention and the manner of attaining them. In the drawings:

FIG. 10 is scanning electron microscopy (SEM) micrographs of (a) milled graphite and (b) several monolayer GNP separated in the drift air column and transmission electron microscopy (TEM) micrographs of the GNPs separated in the column where images (a) and (b) correspond to different resolutions.

DETAILED DESCRIPTION

The following detailed description of the invention refers to the accompanying drawings and to certain preferred embodiments, but the detailed description does not limit the invention. The scope of the invention is defined by the appended claims and equivalents as it will be apparent to those of skill in the art that various features, variations, and modifications can be included or excluded based upon the requirements of a particular use.

The present invention is directed to a unique low-cost method for production of GNPs. This method is based on yielding of thin GNPs from thicker GNPs and lumps of graphite or any other starting material by a combination of milling, sieving, shear milling, jet milling, electrochemical exfoliation, intercalation, cavitation, ultrasonication in ionic liquids or in solvents with surfactants followed by elutriation (air separation), in electrostatic and/or magnetic separation.

Elutriation is a process for separating particles based on their size, shape and density, using a stream of gas or liquid flowing in a direction usually opposite to the direction of sedimentation.

The disclosed method allows the separation of GNPs of desired sized from raw graphite ore, expanded and expandable graphite, milled graphite powder, nano graphite, vein graphite, kish graphite and such. In addition, the same process may be applied to separate graphite based on particle size, density, and mass. The described process allows a percentage of graphene to be obtained from a raw material of graphite. While known methods have to turn a high percentage of initial material into graphene, and are thus complicated and expensive, the disclosed process may be used with any graphene production method is complete, as long as it delivers at least 0.5% graphene nanoplatelets.

Figure 1:
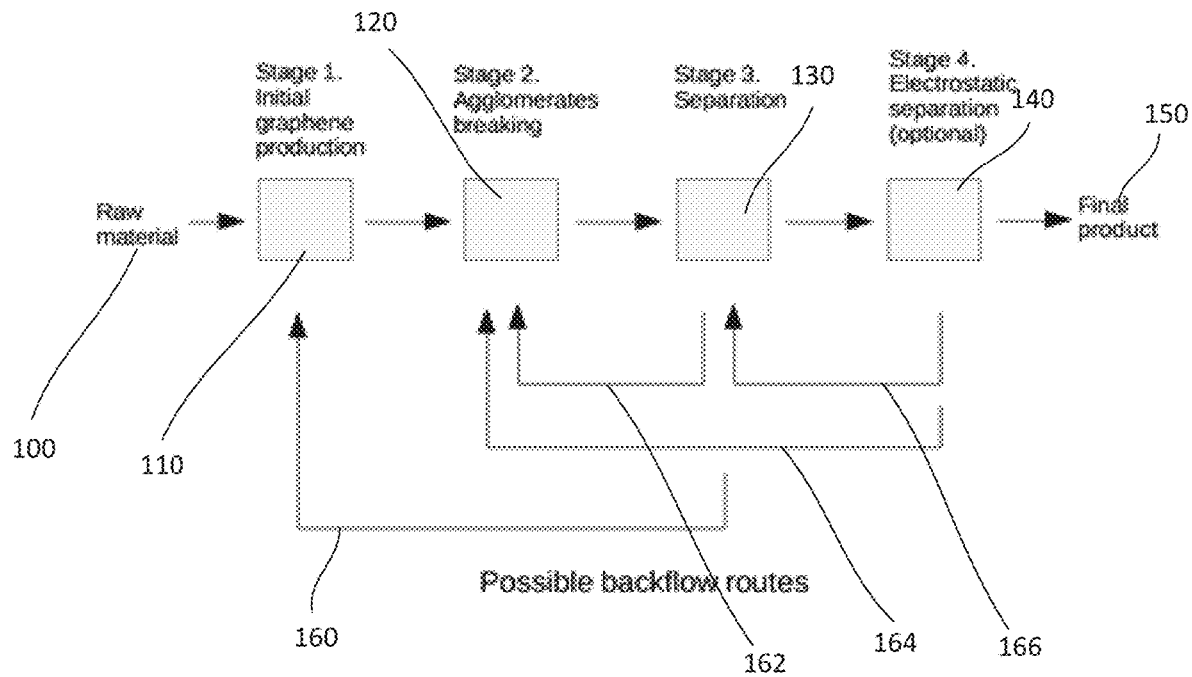
FIG. 1 is a flow diagram of the initial process of graphite raw material according to the present disclosure.

The disclosed separation process includes four different stages. By combining these stages in predetermined sequences for each type of product desired, a narrow fraction of GNPs in the initial raw material can be obtained, thus separation of graphene from graphite by particle mass, size and aspect ratio is performed. FIG. 1 is a flow diagram of the different stages of the process, which include initial graphene production (110), breaking agglomerates (120), graphene separation (130), and optional electrostatic separation (140). Raw material is fed (100) into the process and the final product is output (150).

The raw material is a graphite raw material such as raw graphite ore, expanded and expandable graphite, milled graphite powder, nano graphite, vein graphite, kish graphite, synthetic graphite and HOPG graphite, and such. The raw material is processed to create initial graphene production (110). The initial graphene production step (110) aims to individually exfoliate the starting raw layered material and create a considerable percentage of GNPs in the bulk mixture of raw material. This can be achieved by various methods, including: high-energy milling; ball milling; thermal, chemical, or microwave exfoliation; ultrasonication; cavitation; etc. If ball milling is applied at the initial stage, metal microparticles might become impregnated into GNPs. To eliminate such contaminated particles, an additional stage of magnetic separation may be added. This stage can be used directly after the initial separation stage, or after the first stages of low-energy milling, depending on the initial particle size as well as the required quality of the final product.

After the initial production (110), the process may proceed to breaking the agglomerates (120). It is known that graphene nanoplatelets tend to form agglomerates between previously separated flakes. In some embodiments of the present invention these agglomerates may need to be broken in order to provide better separation results in the process step (120). This task may be accomplished by any method that delivers enough mechanical energy or electrical charge to break agglomerates, but not sufficient energy to break the graphite particles or crush the GNPs. As an example, this stage might include usage of low-energy mills, like blade mills or rotary mills as well as vibro-sieves or stirrers and shakers.

After breaking the agglomerates, the particles are separated based on size and aspect ratio (130). This process is a multi-stage process. Each step in the multi-stage process may be executed once during the procedure, or multiple times depending on demands for final product quality and equipment performance. Initially, the incoming mixture of graphite/graphene is classified by particle size by means of a series of sieves. The mixture is than sorted into fractions based on the lateral particle size. Typical fractions could be 0.5-1 micron, 1-3 microns, 3-5 microns, 5-10 microns, so on and so forth to 5 mm particle size, depending on the desired product properties. Each obtained fraction consists of particles with a narrow lateral size distribution, but masses of those particles are different and proportional to the number of graphene layers in such particles.

Figure 2:
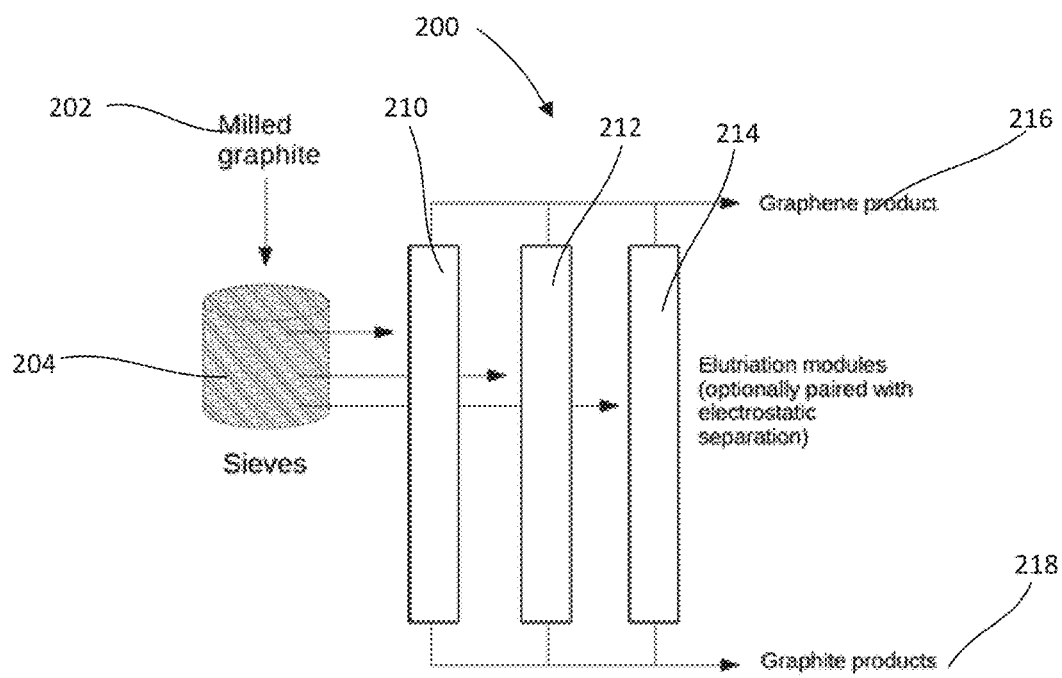
FIG. 2 is a block diagram of the separator system used in the process in FIG. 1.

FIG. 2 shows a separation system (200) to generate the different fractions of particles from the mixture after breaking the agglomerates. The system (200) has a milled graphite input (202) containing the graphite/graphene mixture. The mixture is sent through a series of sieves (204) in order to separate the particles into the fractions. There are three fractions (0-3 microns, 3-15 microns, and 15-30 microns) in this example; however, the graphite/graphene mixture may be separated into the fractions of different range by modifying the sieve sizes. After the particles are separated into the fractions, a particular fraction is routed to an elutriation module (drift air column) for separation of the GNPs by a medium flow. In this example, the different fractions are sent to one of three air separation or elutriation modules (210), (212), and (214). Each of the elutriation modules (210), (212), and (214) separates the graphene from the graphite via an air flow and contributes to a graphene output feed (216) and a graphite output feed (218).

As explained above, the fractions are directed into separation modules, which consist of an air separation drift column for separating the GNPs. Each module has a medium flow speed in the column suitable for separation GNPs of that size from graphite particles. The medium flow speed is adjusted in such a way that the sedimentation speed of particles of a desired size less than the sedimentation speed of heavier particles for the respective fraction size. Thus, the action of gravity and viscous drag forces separate lighter GNPs from graphite particles. The drag forces are reduced to the point at which gravity forces become relatively large, so that the separation is carried out at reasonable air or gas velocity.

In order to estimate the force balance of a spherical nano-particle in a gas stream, in a Stokes regime the gravitation force is equalized by the viscous drag force by the following equation:

$$g\frac{4}{3}\pi r^3 (\rho_{gr} - \rho_{air}) = 6\pi u r \mu$$

The equilibrium velocity (not considering effects of the Brownian motion) may be written as:

$$u = g\frac{2}{9\mu} r^2 (\rho_{gr} - \rho_{air})$$

The density for graphite and for air may be taken as $\rho_{gr}$=2,200 kg/m³ and $\rho_{air}$=1.2 kg/m³, respectively. The dynamic viscosity of the air, $\mu_s$, at standard conditions (at room temperature, normal pressure) is 18.27×10⁶ Pa·s. For nano-sized objects the drag effect depends on the Knudsen number:

$$Kn = 2l_g/d_p$$

At reduced pressure conditions, the separation air column operates in free molecule regime, where Knudsen number is >1.

Figure 7:
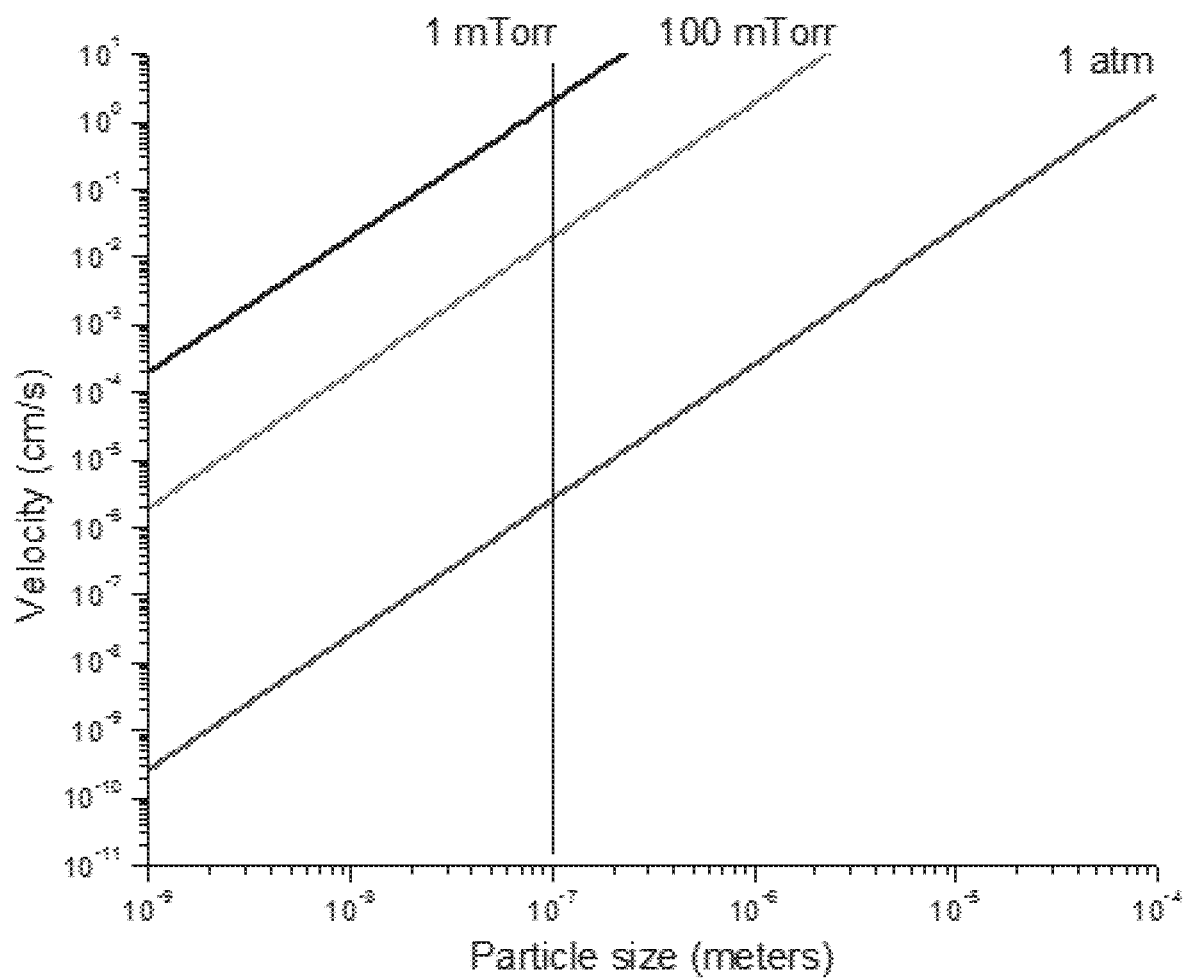
FIG. 7 is graph showing the dependence of critical gas velocity on particle size at various absolute pressure values.

Therefore, the drug force reduction due to the gas low density maintained by reduced pressure allows the separation of GNPs at reasonable gas velocity. Thus, if separation of particles smaller than 1 micron is desired, the air separation drift column should operate at reduced pressure conditions that may be easily achieved by an inexpensive mechanical pump or a liquid nitrogen trap. FIG. 7 is a graph that shows the dependence of the critical gas velocity on the particle size for vanous absolute pressure values. The critical velocity is defined as such that only particle smaller than the certain size can travel upward under the drag force while larger particles sediment under gravity. Sub-micron particles may be separated at 1 mTorr absolute pressure and 0.1 cm/s gas velocity. In contrast, when using atmospheric pressure, one would need to maintain the gas velocity below $10^{-5}$ cm/s. Thus, a minor convection flow due to, for example, a slight temperature difference in various parts of the separation column, would disrupt the separation process. Use of reduced (sub-atmospheric) pressure allows the separation process to be run at a practical gas velocity.

Figure 3:
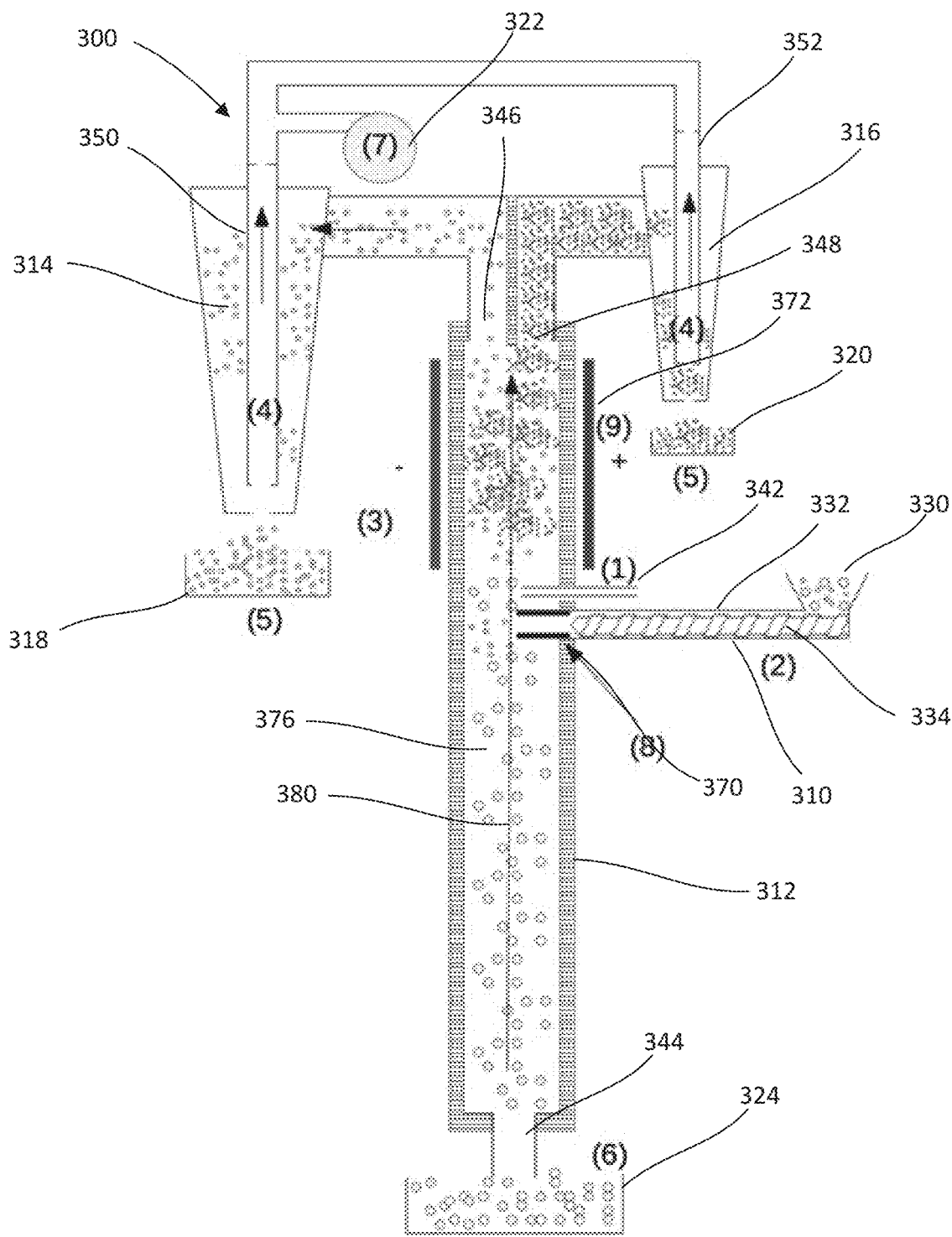
FIG. 3 is a block diagram of an example processing system having both elutriation and electrostatic charging used in the process to separate graphene from graphite raw materials.
Figure 5:
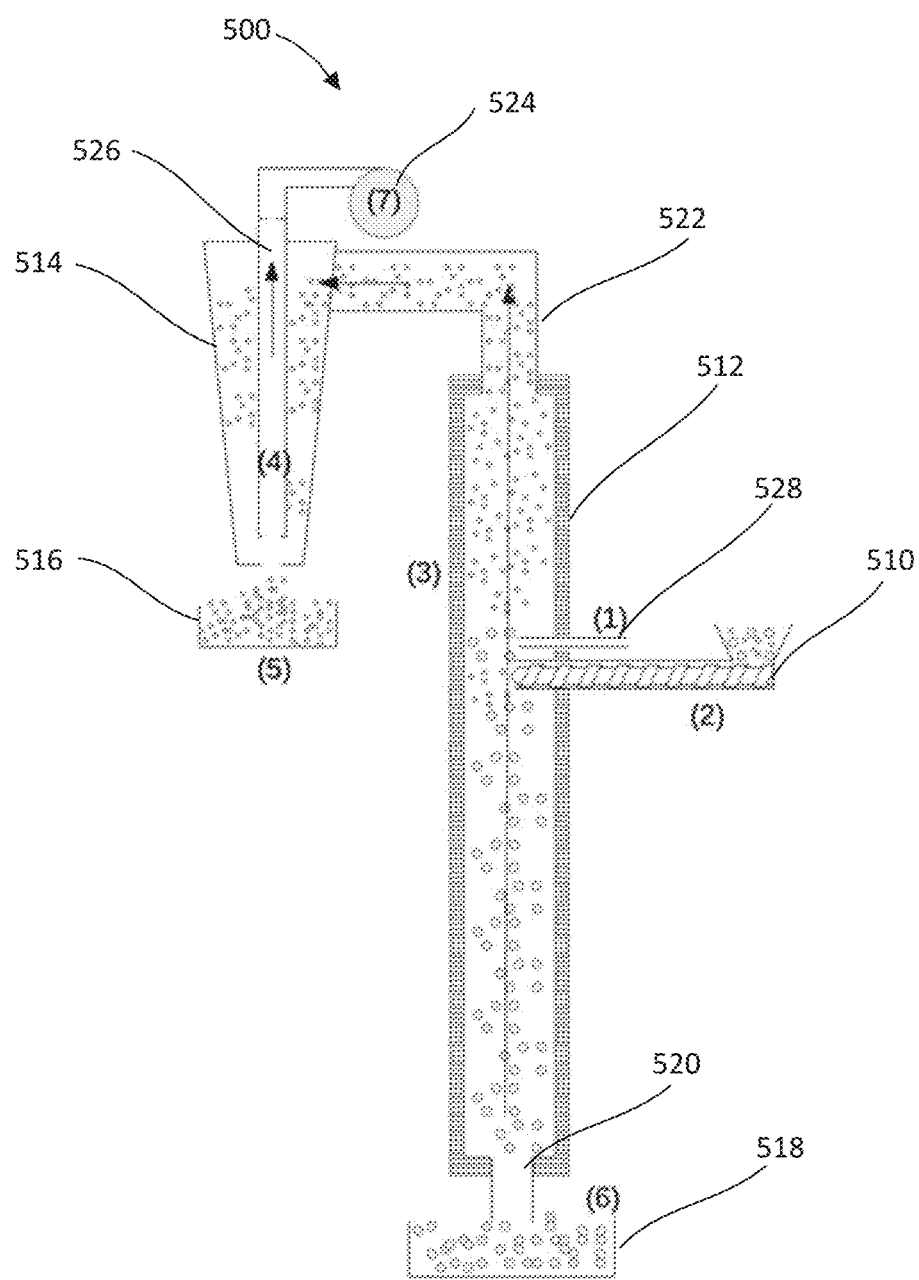
FIG. 5 is a schematic of an elutriation system for separating out graphene particles from graphite raw material at atmospheric pressure.

The separation column may be of a horizontal or vertical design, using an air, or gas, or liquid medium, or suspensions, or aerosols. Examples of a separation column are shown in FIG. 3 and FIG. 5 that may be one of the elutriation modules (210), (212), and (214) in FIG. 2. Particles of a certain fraction size are injected into a stream of the medium, where thinner and lighter particles rise to top of the column (in the direction of medium flow), and heavier particles tend to sediment, because their terminal sedimentation velocity is higher than velocity of the rising medium. If a liquid medium is used, an additional stage of separation the particles from the liquid including drying can be added.

Figure 6:
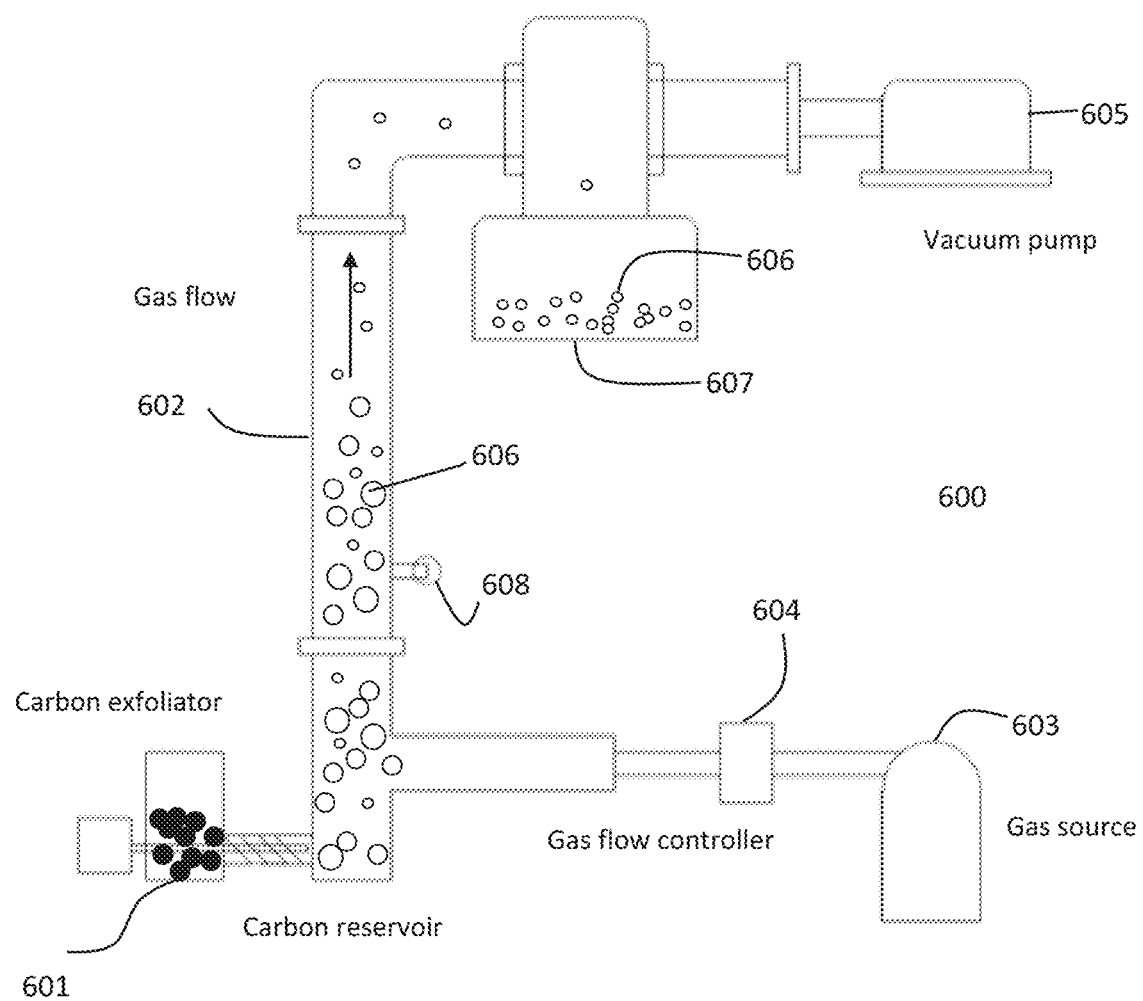
FIG. 6 a schematic of the separation system using sub-atmospheric pressure

FIG. 6 shows one of the possible designs of the reduced pressure column (600) which utilizes the principle of the sub-atmospheric separation. Similarly to designs shown in FIGS. 3 and 5, exfoliated carbon stock (601) is supplied at the bottom of the drift column. The carrier gas is delivered from a gas storage vessel (such as a gas cylinder) (603). The gas flow is regulated by an electronic flowmeter (604). A vacuum pump (605), either of rotary of turbomolecular type, is connected to the opposite end of the drift column. The pumping speed is regulated by a baffle valve, which is an integral component of the pump and the pressure inside the drift tube (602) is monitored by a vacuum gauge (608). By adjusting the pumping speed and the gas flow rate, the gas velocity and the absolute pressure conditions are satisfied as shown in FIG. 6. The nano-particles (606) enter the drift column and are picked up by the gas stream (shown by the arrow). Only particles smaller than the desired size reach the expansion chamber. When the carrier gas enters the expansion chamber, the gas velocity drops and heavier particles settle on the bottom of the expansion chamber, while lighter particles continue to travel down the pipe and are eventually captured by a filter in the vacuum pump. Thus, the scheme allows for precise control over the particle size.

As will be explained below, the separation module operates by injecting the material stream either in a continuous or pulsed mode to be sorted into a chamber, which contains a column of rising air or another medium. Injection of the particle stream may be performed by an auger screw feed or using an air stream to blow particles into the column. Inside the separation column, air drag on the objects supplies an upward force, which counteracts the force of gravity and lifts the material to be sorted up into the air. Due to the dependence of air drag on object size and shape, the objects in the moving air column are sorted vertically and can be separated in this manner. Additional precision of separation could be achieved by varying the medium gases as well as their pressure and temperature.

Heavy particles (leftovers) may be recycled and directed to the beginning of the procedure (the initial preparation stage (110)) in FIG. 1 and FIG. 6, in order to increase yield. Particles that are not classified as GNPs after many cycles of separation could be classified as special types of graphite nanopowders, so this approach also describes a method for obtaining graphite nanopowders. For example, leftover particles from the separation stage (130) may be fed back into the initial preparation stage (110) as shown by a back flow route (160) in FIG. 1. Alternatively, leftover particles from the separation stage (130) may be fed back into the agglomerates breaking stage (120), as shown by the back flow route (162) in FIG. 1.

Nanoparticles classified as GNPs of a designated thickness are separated from the medium stream by a particle sedimentation module. This can be accomplished by the use of cyclones of different constructions (horizontal or vertical), retention basins, expansion chambers or filters with pores of corresponding size. An example of a system to perform the classifications of the particles is shown in FIG. 2 and FIG. 6.

Figure 4:
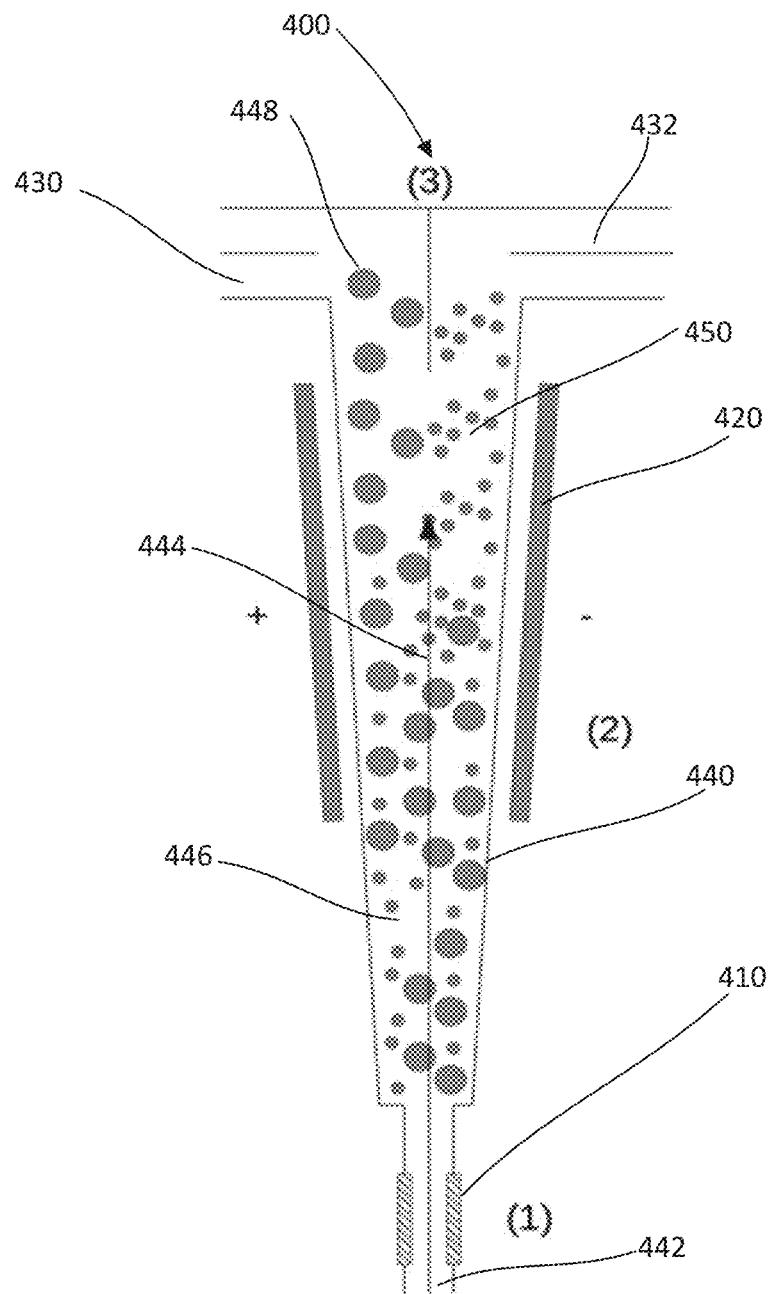
FIG. 4 is a schematic of an optional electrostatic charge system for sorting graphene particles by size and shape.

The last stage is the optional electrostatic separation (140) in FIG. 1. A flux of particles in a flow of air are charged by a method that may include: contact with or hitting at a charged surface (negatively or positively), passing through an electrostatic field, passing through a corona discharge field, electromagnetic radiation, passing through an electron beam, etc. Charged particles are directed through an electrical field with opposite charges being perpendicular to the flow of medium. Particles with different charge and mass will change their trajectories in the electrical field. The particles are then trapped into different collectors, while moving with the stream of air. FIG. 4 shows an example electrostatic separation system (400) for this process.

Figure 9:
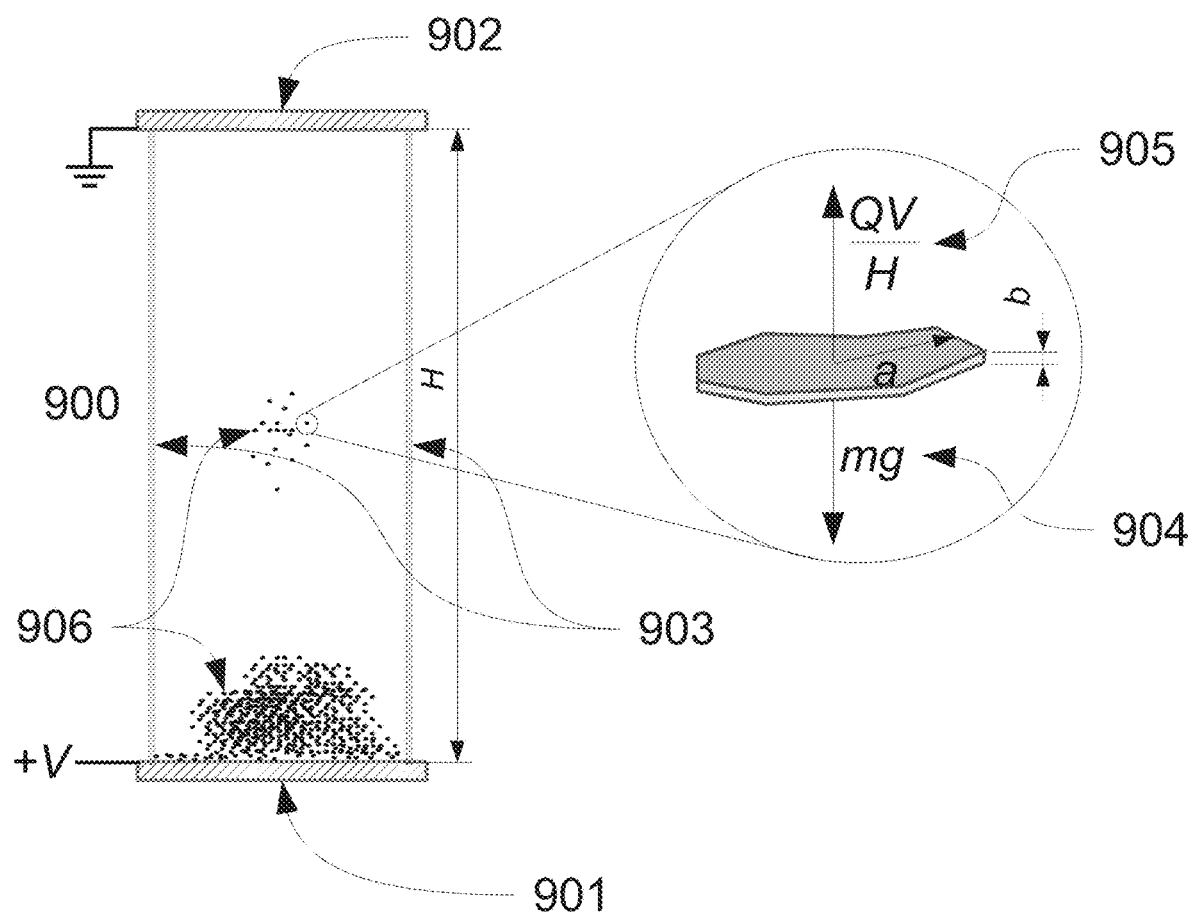
FIG. 9 is a schematic of a system that uses the electrostatic separation concept described herein.

The electrostatic separation system is based on the fact that particles obtain different charges in correspondence to their mass, purity, and aspect ratio. The concept of an electrostatic separation column (900) is depicted on FIG. 9. The column (900) has a positive electrode (901) and a negative electrode (902) and walls (903) that confine the nanoplatelets to the volume between the electrodes (901) and (902). The nanoplatelets (906) attain electric charge by contacting the electrode (901) as shown in FIG. 9, or alternatively, by passing through an electrostatic field, passing through a corona discharge field, electromagnetic radiation, passing through an electron beam, etc. The charge attained by the particle is given by the formula Q=CU, where Q is the amount of electric charge attained by the particle and U is the electric potential of the electrode and C is the self-capacitance of the nanoplatelet, which can be estimated by the formula:

$$C \approx 4\pi\varepsilon_0 \frac{a}{\pi}\left(1 + \frac{\pi-2}{\pi}\sqrt{\frac{b}{a}}\right) \approx 4\varepsilon_0 \cdot a \quad \text{for } b \ll a$$

where b is the is the thickness of the nanoparticle, a—lateral the lateral dimension of the nanoparticle. As it seen from this equation, the electric charge attained by the thin and thick platelets are similar.

The gravitational (904) and electrostatic (905) forces are acting on the platelet in the separation column (900). If the force of gravity is larger than the electrostatic force, the platelet migrates to the opposite electrode. At the equilibrium, the balance of the forces is given by equation:

$$mg = Q\frac{V}{H} = CV\frac{V}{H} = 4\varepsilon_0 V^2 \frac{a}{H}$$

Where H—is the separation between the electrodes of the column and $m = \pi a^2 b\rho$—is the mass of the nanoplatelet. The electrostatic forces acting on nanoplatelets having similar lateral sizes but different thicknesses are similar but the gravity force acting on the thicker platelet is higher because the thicker platelet is heavier, resulting in the thinner platelet migrating to the opposite electrode, while the thicker platelet stays. Thus, the separation occurs.

The charging may be done by another method, for example by irradiation of the graphene nanoparticles with an electron beam. The total electric charge acquired by the GNP as the result of the irradiation will be proportional to the area of the platelet. Thus, the platelets having similar lateral size but different thickness will have identical electric charges and the condition for the separation is satisfied. The separation will work for any charging method, where the electric charge attained by the platelet is proportional to its area. These methods include but are not limited to impact ionization by ions, radiation-induced ionization, convection-induced ionization.

The electrostatic repulsion presence of the electric charge on the particles in the flow also prevents agglomeration of the particles. Breaking the agglomerates formed by the nanoplatelets might require a considerable voltage as Van-der Waals forces binding particles together must be exceeded by the force of electrostatic repulsion. By varying the speed of medium flow, electrical field potential, and initial charging efficiency, different particle sizes are easily separated from each other. As with the other stages, the remaining particles may be fed back into the previous stages. For example, extra particles may be fed back into the agglomerates breaking stage (120), as shown by the back flow route (164) in FIG. 1. Extra particles may also be fed back into the separation stage (130), as shown by the back flow route 166 in FIG. 1

An example of a system (300) that performs the last two stages of the process in FIG. 1 is shown in FIG. 3. The system (300) allows air separation (elutriation) and electrostatic separation to be combined in one system, providing access to separation based on two different parameters simultaneously. One of the important advantages of the combined system (300) includes repulsion of particles of the same charge, thus preventing particle agglomeration and improving separation quality and yield.

The system (300) includes a product feeder (310), an air separation column (312), a small GNP precipitation module (314), a large GNP precipitation module (316), a small GNP collector (318), a large GNP collector (320), an air compressor (322), and a graphite collector (324). The product feeder (310) includes a hopper (330) that accepts the mixture. The hopper (330) is connected to a tube (332) that includes an auger (334) to feed the mixture to the air column (312). The mixture in the hopper (330) has been separated into particles of a certain fraction from a system such as the system in FIG. 2.

The drift air column (312) includes a medium flow speed sensor (340), which measures the speed of the air flow in the air column (312). The air flow speed data from the medium flow speed sensor (340) is used to control the medium flow speed and insure that the speed is constant. The air column (312) is a sealed tube having a bottom outlet (342) leading to the graphite collector (324) and a first conduit (344) leading to the small GNP precipitation module (314) and a second conduit (346) leading to the large GNP precipitation module (316). The precipitation modules (314) and (316) are cyclones that separate the nanoplatelets. There may be additional precipitation modules for separating different sized particles. The air column (312) has a flow of air that pushes upward. The air flow in the air column (312) may be generated by a compressor or other devices. The air column (312) may be a hollow tube with a smooth inside surface or it may be replaced by a series of hollow tubes connected and placed in different horizontal and vertical planes. The air column (312) may also have an inner surface of more complicated geometries in order to improve particle separation by increasing the flow path length, adding turbulence zones, etc. The drift column may have a vacuum pump, of either mechanical or cryogenic type connected to the downstream side of the column.

The compressor (322) is coupled to a pair of conduits (350) and (352), which are in the small GNP precipitation module (314) and the large GNP precipitation module (316), respectively. The compressor (322) generates air flow in the direction of the arrows in FIG. 3 through each of the conduits (350) and (352) to create positive flux and particle flow.

The particles fed through the product feeder (310) are charged by a charge-inducing module (370). The upper portion of the air separation column (312) includes an electrical field generator (372).

The operation of the system (300) begins with feeding of the graphene/graphite mixture through the input hopper (330). The mixture is fed via the auger (334) to the air column (312). The material stream is injected either in a continuous or pulsed mode from the auger (334). The air column (312) includes a separation chamber (376) with a column of rising air in the direction of an arrow (380) in FIG. 3. Air drag on the objects inside the separation chamber (376) of supplies an upward force, which counteracts the force of gravity and lifts the material to be sorted up into the air to the upper portion of the air column (312). The heavier graphite particles fall through the bottom outlet (344) and are collected in the graphite collector (324). Due to the dependence of air drag on object size and shape, the objects in the moving air column are sorted vertically and can be separated in this manner in the separation chamber (376). In this example, the air separation of the fraction of the particles fed into the separation chamber (376) is carried out at an airspeed that is between 1 to 5 times the hovering speed of flakes of the pure product of a corresponding fraction. In this example, the resulting graphene nanoplatelets have a thickness of 0.34-100 nm and an aspect ratio of 2-1000.

In addition, the feed into the column (312) is charged by the charge inducing module (370), which is a corona discharge field generator in this example. The charged GNPs are lifted up by the air flow to the upper portion of the air column (312) and subjected to an electrical field generated by the electrical field generator (372). The charged particles are directed through an electrical field with opposite charges being perpendicular to the flow of the medium. Particles with different charge and mass will change their trajectories in the electrical field. Particles obtaining different charges in correspondence to their mass, purity, and aspect ratio. The graphene particles have the same maximum charge density, but total charge of a particle is proportional to the particle mass. By varying the speed of medium flow, electrical field potential, and initial charging efficiency, different particle sizes are easily separated from each other to the small GNP precipitation column (314) through the conduit (346) and to the large GNP precipitation column (316) through the conduit (348).

FIG. 4 is an example electrostatic system (400) that may be a stand alone stage that may be optionally applied to separated particles. The electrostatic system (400) includes a charge inducing module (410), an electrical field generator (420), a large GNP collector conduit (430) and a small GNP collector conduit (432). The system (400) includes an air column (440) having an inlet (442). The medium is fed through the inlet (442) in the direction as shown by an arrow (444). In general, the medium may be driven by a compressor or a negative pressure gradient.

As the feed mixture is fed through the inlet (442), particles are charged by the charge inducing module (432). The charged particles (446) are fed upward through the column (440) through an electric field created by the electric field generator (420). As explained above, the particles are separated by the electric field to larger GNPs (448), which are collected by the large GNP collector conduit (430) and smaller GNPs (450), which are collected by the small GNP collector conduit (432).

FIG. 5 is an example elutriation system (500), which may be used for one of the elutriation modules (210), (212), and (214) in FIG. 4. The system (500) includes a product feeder (510), an air separation column (512), a precipitation module (514), a GNP collector (516) and a graphite collector (518). The product feeder (510) feeds the graphene/graphite mixture into the air separation column (512), which includes a bottom outlet (520) leading to the graphite collector (518) and a top outlet (522), which leads to the precipitation module (514). A compressor (524) generates air flow in a conduit (526) in the precipitation module (514).

The system (500) operates by controlling the medium flow through the air separation column (512). The speed is measured by an air speed sensor (528), which allows control over particle separation. Then, GNPs are propelled to the precipitation module (514) and graphite drops down into the outlet (520).

Many other nanoscale materials may be produced in using the disclosed procedure. The main principle of the above described process is the separation of nanosheets of a material with low mass and high aspect ratio from the bulk material, so two dimensional graphene-like materials such as mica, $MoS_2$, $WS_2$, BN, etc. could be processed by the aforementioned process in order to obtain nanosized platelets. When electrostatic separation is used for platelets comprised from materials with poor or no electrical conductivity the electric charge cannot be transferred to platelet through contact with a charged electrode and an alternative method including but not limited to passing particles through corona discharge, irradiating the particles with X-ray or UV radiation, subjecting the particles to a beam of electrons or ions negatively or positively charged, has to be used.

Using the process described above, thin GNPs may be separated in a cost effective manner. In addition, thicker GNPs or graphite flakes can be reprocessed, reducing waste, or be used for different applications. The above process does not rely on harsh chemical treatment, and does not result in damage or degradation of initial properties of layered materials. In addition, the process is a fully dry, "green" method that either completely avoids the use of solvents or only select stages may be performed in solutions.

Figure 8:
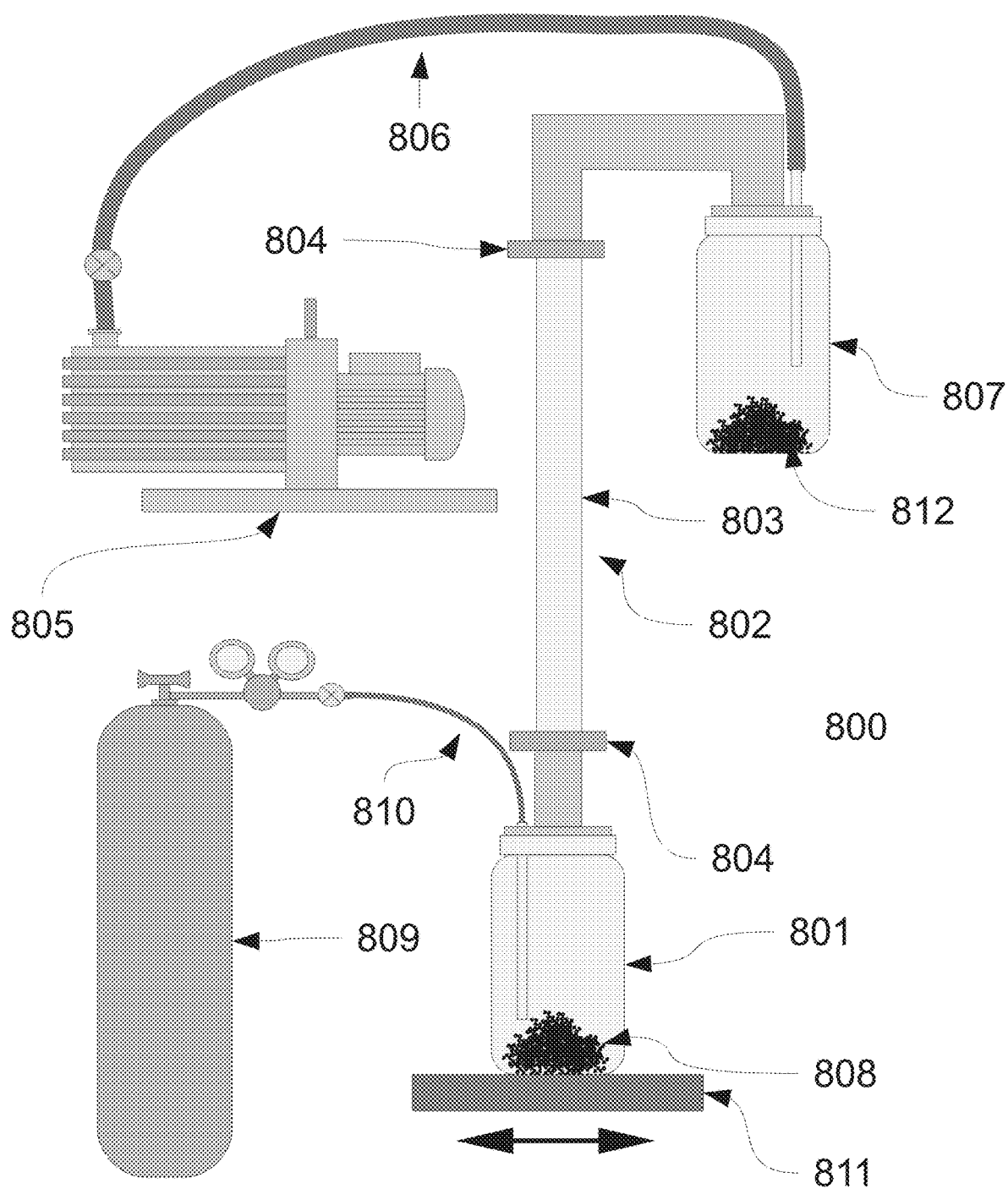
FIG. 8 is a schematic of a benchtop separation system for separating out graphene particles from graphite raw material.

One embodiment of the invention is realized in a bench-top separation system (800) depicted in FIG. 8. Graphene flakes are extracted from a graphite powder manufactured by energetic ball-milling using Pulverisette 6 mill. Ten grams of natural graphite are milled for 90 min at 400 rpm using 20 mm stainless-steel balls. The milled powder (808) is placed in the vessel (801) on the bottom of a drift column (802). The drift column is assembled from 2" quartz tubing (803) terminated with KF-50 connectors (804). The tubing (803) is connected to a one-stage mechanical pump (805) via a flexible metal bellow (806). The collection volume is assembled from a 1 L glass jar (807) connected to the drift column using flexible tubing. The system pumps down and an external gas is admitted from the gas cylinder (809) through the tubing (810) to the system (800) to keep the pressure equilibrated at 300 Torr. The graphite mixture is continuously agitated by a shaker (811). This breaks down the agglomerates formed by the platelets and prevents any further agglomeration. After approximately 20 minutes of operation a fine black powder (812) is collected in the collection vessel and on the tube walls.

Samples of the powder were collected and subjected to Scanning Electron Microscopy (SEM) and Transmission Electron Microscopy (TEM) analysis as shown in FIG. 10. The collected powder is seen in a TEM image (1001) and an SEM image (1002). The TEM image (1001) shows (a) milled graphite and (b) several monolayer GNP separated in the drift air column. The SEM image 1002 shows TEM micrographs of the nanoplatelets separated by the column. The analysis showed abundant one and two-layer graphene flakes, as demonstrated by the TEM micrographs and the several monolayer GNP separated in the draft air column. The images (a) and (b) in the image (1001) in FIG. 10 correspond to different resolutions.

While the present inventions have been described in connection with a number of exemplary embodiments and implementations, the present inventions are not so limited, but rather cover various modifications, and equivalent arrangements, which fall within the purview of prospective claims.

What is claimed is:

1. A method for enrichment of a mixture of graphene nanoplatelets (GNP) comprising:
   Initially producing the GNPs from raw graphene material by at least one high-energy milling, ball milling, thermal, chemical, and microwave exfoliation;
   using a series of sieves to separate the GNPs into fractions based upon lateral particle size range;
   introducing GNPs of a fraction, including various sizes within the lateral particle size range, into a separation column including flow of a medium therein;
   increasing the content of relatively smaller sizes of the GNPs within an expansion chamber of the separation column by regulating the flow of the medium through the separation column;
   reducing a velocity of the medium within the expansion chamber so that relatively heavier GNPs, of the relatively smaller sized GNPs, therein settle on a bottom of thereof; and
   collecting resulting GNPs with desired sizes.

2. The method of claim 1, wherein the medium is a liquid.

3. The method of claim 2, wherein the liquid is water, organic solvent or ionic liquid.

4. The method of claim 1, wherein the medium is a gas including air, nitrogen, argon, helium, xenon, a noble gas, a vapor of a liquid, or gaseous sulfur hexafluoride.

5. The method of claim 4, wherein the pressure of the gas is equal or close to atmospheric pressure.

6. The method of claim 4, wherein the pressure of the gas is substantially lower than atmospheric pressure.

7. The method of claim 4, wherein the pressure of the gas is substantially higher than atmospheric pressure.

8. The method of claim 1, wherein the GNPs have a thickness of 0.34 to 100 nm and an aspect ratio of 2 to 1000.

9. The method of claim 1, further comprising electrostatically separating the resulting GNP.

10. The method of claim 9, wherein the electrostatic separation and separation by medium flow are performed simultaneously.

* * * * *